United States Patent
Omi et al.

(10) Patent No.: US 12,039,718 B2
(45) Date of Patent: Jul. 16, 2024

(54) INFERENCE APPARATUS, MEDICAL APPARATUS, AND PROGRAM

(71) Applicant: General Electric Company, Schenectady, NY (US)

(72) Inventors: Yasuo Omi, Tokyo (JP); Shotaro Fuchibe, Tokyo (JP)

(73) Assignee: General Electric Company, Schenectady, NY (US)

(*) Notice: Subject to any disclaimer, the term of this patent is extended or adjusted under 35 U.S.C. 154(b) by 579 days.

(21) Appl. No.: 17/240,104

(22) Filed: Apr. 26, 2021

(65) Prior Publication Data

US 2021/0334959 A1 Oct. 28, 2021

(30) Foreign Application Priority Data

Apr. 28, 2020 (JP) ................................ 2020-079650

(51) Int. Cl.
*G06T 7/00* (2017.01)
*G06N 5/04* (2023.01)

(52) U.S. Cl.
CPC ............ *G06T 7/0012* (2013.01); *G06N 5/04* (2013.01); *G06T 2207/10081* (2013.01); *G06T 2207/10116* (2013.01); *G06T 2207/20192* (2013.01); *G06T 2207/30068* (2013.01); *G06T 2207/30096* (2013.01)

(58) Field of Classification Search
CPC ................................. G06T 7/0012; G06N 5/04
See application file for complete search history.

(56) References Cited

U.S. PATENT DOCUMENTS

| | | | |
|---|---|---|---|
| 2018/0075628 A1* | 3/2018 | Teare | G06F 18/24143 |
| 2018/0365824 A1* | 12/2018 | Yuh | G06T 7/0012 |
| 2020/0090381 A1 | 3/2020 | Teare | |
| 2021/0104313 A1* | 4/2021 | Mizobe | G06N 20/00 |
| 2021/0208076 A1* | 7/2021 | Chang | G01N 21/6456 |
| 2021/0279866 A1* | 9/2021 | Svekolkin | G06V 10/454 |
| 2022/0092787 A1* | 3/2022 | Cui | G06T 7/155 |
| 2022/0414868 A1* | 12/2022 | Wang | G06V 10/82 |
| 2023/0048725 A1* | 2/2023 | Barbour | G06F 18/214 |

FOREIGN PATENT DOCUMENTS

JP 2019216848 A 12/2019

OTHER PUBLICATIONS

Japan application 2020-079650 filed Apr. 28, 2020—Office Action issued Aug. 3, 2021; 3 pages.

* cited by examiner

*Primary Examiner* — David Bilodeau

(57) ABSTRACT

In accordance with certain embodiments of the present disclosure an apparatus includes: an inference section for performing inference using a learned model. The learned model is generated by multi-channel learning processing of a multi-channel image containing image information on each of three one-channel images (an original image, a histogram-equalized image, and edge-enhanced image), and ground-truth data CD The apparatus also includes a multi-channel image producing section for producing a multi-channel image containing image information on each of three one-channel images (an original image, a histogram-equalized image, and an edge-enhanced image) of a patient. The inference section inputs the multi-channel image to the learned model, performs the inference, and outputs an output image as output data.

8 Claims, 14 Drawing Sheets

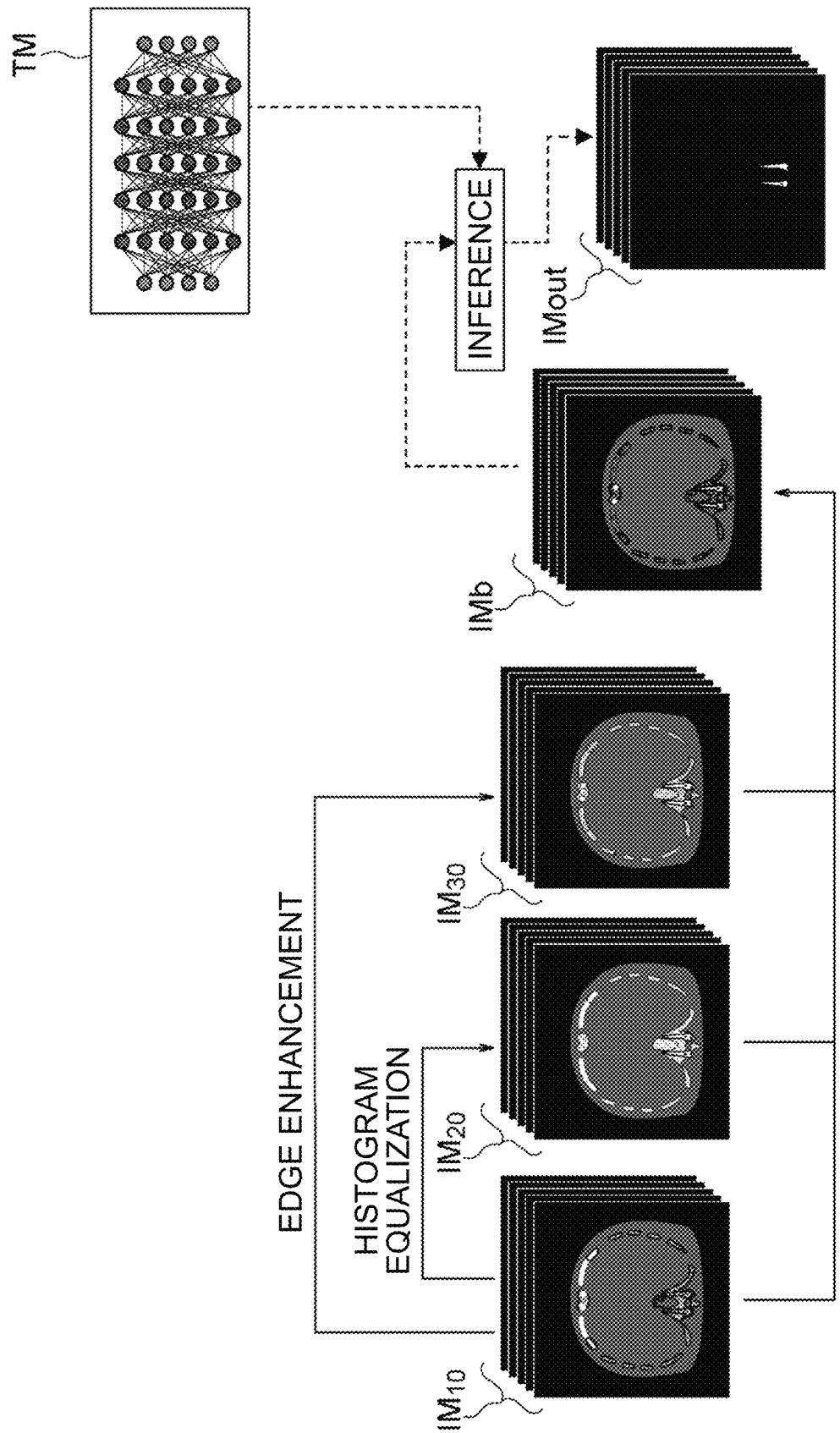

FIG.14

| | OBJECTIVE | COMBINATION OF ONE-CHANNEL IMAGES | | | GROUND-TRUTH DATA |
|---|---|---|---|---|---|
| (a) | STAGING OF HEPATOCELLULAR CARCINOMA | PLAIN CT IMAGE | CONTRAST-ENHANCED ARTERIAL-PHASE IMAGE | CONTRAST-ENHANCED PORTAL VENOUS-PHASE IMAGE | INDEX |
| (b) | LOCALIZATION OF ISCHEMIC AREA | MR-T2 IMAGE | MR-DWI IMAGE | MR-ADC IMAGE OR MR-FLAIR IMAGE | IMAGE |
| (c) | TUMOR DETECTION | MR-T1 IMAGE | MR-T2 IMAGE | MR-DWI IMAGE | POSITION DATA |
| (d) | LESION DETECTION; STAGING | CT-MONO 40 KEV IMAGE | CT-MONO 55 KEV IMAGE | CT-MONO 70 KEV IMAGE | INDEX; POSITION DATA |
| (e) | TUMOR DETECTION | LOW-VOLTAGE IODINATED CONTRAST-ENHANCED MAMMOGRAPHIC IMAGE | HIGH-VOLTAGE PLAIN MAMMOGRAPHIC IMAGE | N/A | POSITION DATA |

INFERENCE APPARATUS, MEDICAL APPARATUS, AND PROGRAM

FIELD

The present disclosure relates to an inference apparatus for performing inference using a learned model, a medical apparatus having the inference apparatus, and a program for performing inference using a learned model.

BACKGROUND

X-ray CT apparatuses are known as medical apparatuses for non-invasively capturing an image of the inside of a patient's body. Since X-ray CT apparatuses are capable of imaging a body part to be imaged in a short duration, they are widely used in medical institutions, such as hospitals.

In imaging a patient using an X-ray CT apparatus, a variety of CT images according to the clinical objective can be acquired by scanning the patient with various scan conditions. A physician, such as a radiologist, performs radiographic interpretation on the acquired CT image, and makes a diagnosis based on a result of the radiographic interpretation.

In recent years, AI (Artificial Intelligence) has been used to execute image processing and produce images suitable for clinical medicine. An example of AI is disclosed in Japanese Patent Application KOKAI No. 2019-118670, where is disclosed an example of image processing using machine learning.

Among the AI techniques, image processing employing deep learning (denoted as "DL" hereinbelow) in particular has been growing in use.

Studies of DL-based image processing were started and have been developed from those of image classification on natural images, etc. Typical successes of DL-based image processing on natural images include image classification on camera images, human detection in videos from security cameras, etc.

On the other hand, successes of DL-based image processing on medical images include image processing of color images, such as fundus camera images and endoscopic images, and there is a tendency of the DL-based image processing of fundus camera images and endoscopic images to be increasingly used in practice.

However, image processing of medical images displayed in grayscale, such as CT images, is still behind the aforementioned color images in practical application of DL-based image processing. The reason thereof may be considered as follows.

A DL platform, represented by TensorFlow or the like, can handle three-channel information. Consider here a color image, such as a fundus camera image or an endoscopic image: a color image provides three sets of information (three-channel information corresponding to RGB) from one image. Therefore, in handling a color image, the three channels handled by the DL platform can be efficiently used.

Next, consider a grayscale image, such as a CT image or an MR image. In a grayscale image, one image provides only one set of information (that is, one-channel information). Therefore, a grayscale image bears less information per image than a color image. Thus, in handling a grayscale image, only one of the three channels that can be handled by a DL platform is efficiently used.

Therefore, grayscale images cannot provide efficient use of all of the channels that can be handled by a DL platform, and precision of inference is sometimes difficult to improve.

This is considered to be one of causes why a delay is encountered in practical application of DL-based image processing of grayscale images, such as CT images.

Therefore, there is a need for a technique with which precision of inference can be improved in the case that grayscale images, such as CT images, are handled.

BRIEF SUMMARY

This summary introduces concepts that are described in more detail in the detailed description. It should not be used to identify essential features of the claimed subject matter, nor to limit the scope of the claimed subject matter.

The present disclosure, in its first aspect, is an inference apparatus comprising an inference section for performing inference using a learned model, the learned model being generated by learning processing of learning a first multi-channel image containing image information on each of a first plurality of one-channel images, and ground-truth data; and a multi-channel image producing section for producing a second multi-channel image containing image information on each of a second plurality of one-channel images of a patient. Th inference section inputs the second multi-channel image to the learned model, and performs the inference.

The present disclosure, in its second aspect, is a medical system comprising an inference section for performing inference using a learned model, the learned model being generated by learning processing of learning a first multi-channel image containing image information on each of a first plurality of one-channel images, and ground-truth data; and a multi-channel image producing section for producing a second multi-channel image containing image information on each of a second plurality of one-channel images of a patient. The inference section inputs the second multi-channel image to the learned model, and performs the inference.

The present disclosure, in its third aspect, is a program for causing a processor to execute the processing of performing inference using a learned model, the learned model being generated by learning processing of learning a first multi-channel image containing image information on each of a first plurality of one-channel images, and ground-truth data; and producing a second multi-channel image containing image information on each of a second plurality of one-channel images of a patient. The processing of performing inference inputs the second multi-channel image to the learned model, and performs the inference.

The present disclosure, in its fourth aspect, is a non-transitory, computer-readable recording medium in which one or more processor-executable instructions are stored, the one or more instructions causing, when executed by a processor, the processor to execute an operation comprising the acts of: performing inference using a learned model, the learned model being generated by learning processing of learning a first multi-channel image containing image information on each of a first plurality of one-channel images, and ground-truth data; and producing a second multi-channel image containing image information on each of a second plurality of one-channel images of a patient. The act of performing inference using the learned model of (1) comprises the act of inputting the second multi-channel image to the learned model, and performs the inference.

According to the present disclosure, a learned model for performing inference is generated using on a first multi-channel image containing image information on each of a first plurality of one-channel images. Then, in performing inference, a second multi-channel image containing image information on each of a second plurality of one-channel images is produced, and inference is performed with the second multi-channel image as an input image for the learned model. Since learning and inference are performed with an image containing more information than a case in which a learned model is generated with only a one-channel image or in which only a one-channel image is served as an input image for the learned model, precision of inference can be improved.

BRIEF DESCRIPTION OF THE DRAWINGS

FIG. 13 is an explanatory diagram for processing of extracting a metal member; and FIG. 14 is a table showing examples of combinations of images that can be used.

DETAILED DESCRIPTION

Embodiments of the present disclosure will now be described, by way of example, with reference to the Figures, but the present disclosure is not limited thereto.

Figure 1:
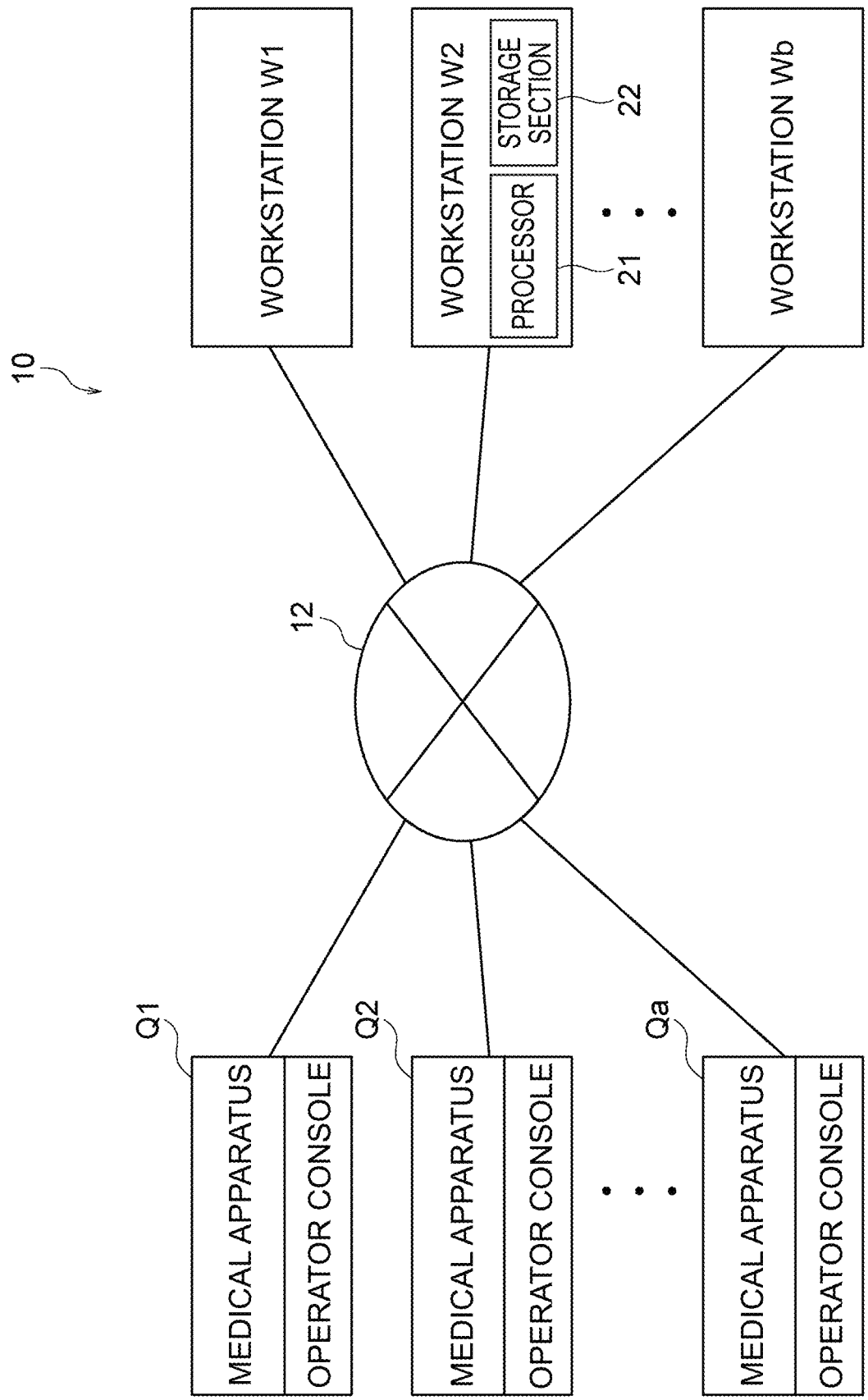
FIG. 1 is a diagram showing a medical information management system 10 comprising an inference apparatus in one embodiment of the present disclosure.

FIG. 1 is a diagram showing a medical information management system 10 comprising an inference apparatus in one embodiment of the present disclosure.

The system 10 comprises a plurality of modalities Q1 to Qa. Each of the plurality of modalities Q1 to Qa performs diagnosis, treatment, and/or the like on a patient.

Each modality is a medical system comprising a medical apparatus and an operator console. The medical apparatus is for collecting data from a patient, to which apparatus the operator console is connected for use in handling of the medical apparatus. The medical apparatus is an apparatus for collecting data from a patient, and a wide range of apparatuses, such as, for example, a plain X-ray imaging apparatus, an X-ray CT apparatus, a PET-CT apparatus, an MRI apparatus, an MRI-PET apparatus, and a mammography apparatus, may be used as the medical apparatus.

The system 10 further has a plurality of workstations W1 to Wb. These workstations W1 to Wb include, for example, those used in a hospital information system (HIS), a radiology information system (RIS), a clinical information system (CIS), a cardiovascular information system (CVIS), a library information system (LIS), an electronic medical record (EMR) system, and/or any other image and information management system, etc., and those used in image inspection works by radiologists.

In the workstations W1 to Wb, there is a workstation which executes inference processing using a learned model on image data sent from the modalities. It is assumed here that a workstation W2 is for executing inference processing.

The workstation W2 comprises a processor 21 and a storage section 22. Now functions of the workstation W2 will be described hereinbelow.

Figure 2:
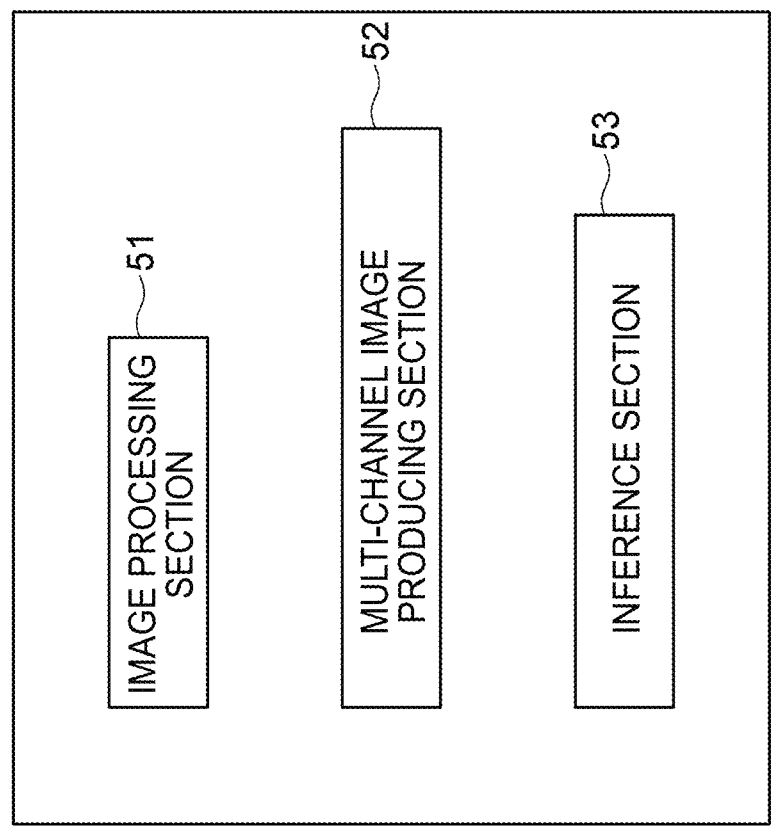
FIG. 2 is a block diagram of functions of a workstation W2.

FIG. 2 is a block diagram of functions of the workstation W2.

The workstation W2 is configured to execute the following functions 51 to 53.

Figure 10:
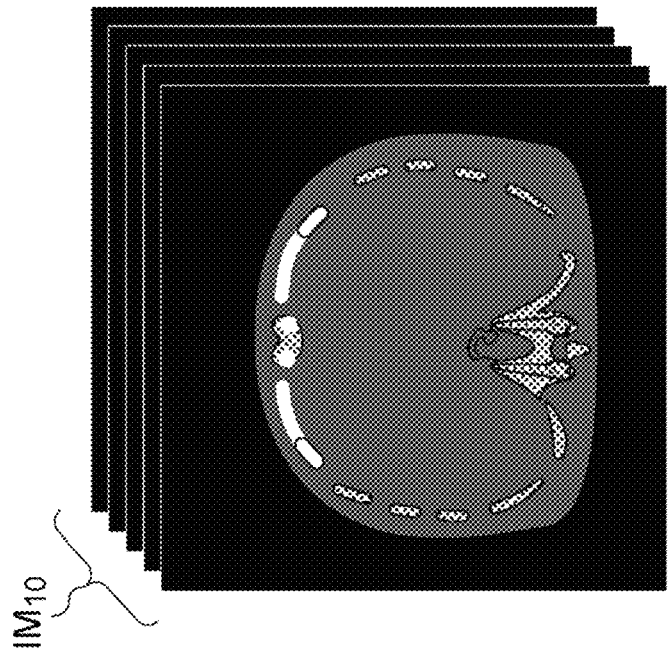
FIG. 10 is a diagram schematically showing a plurality of CT images IM10 acquired by a scan.
Figure 11:
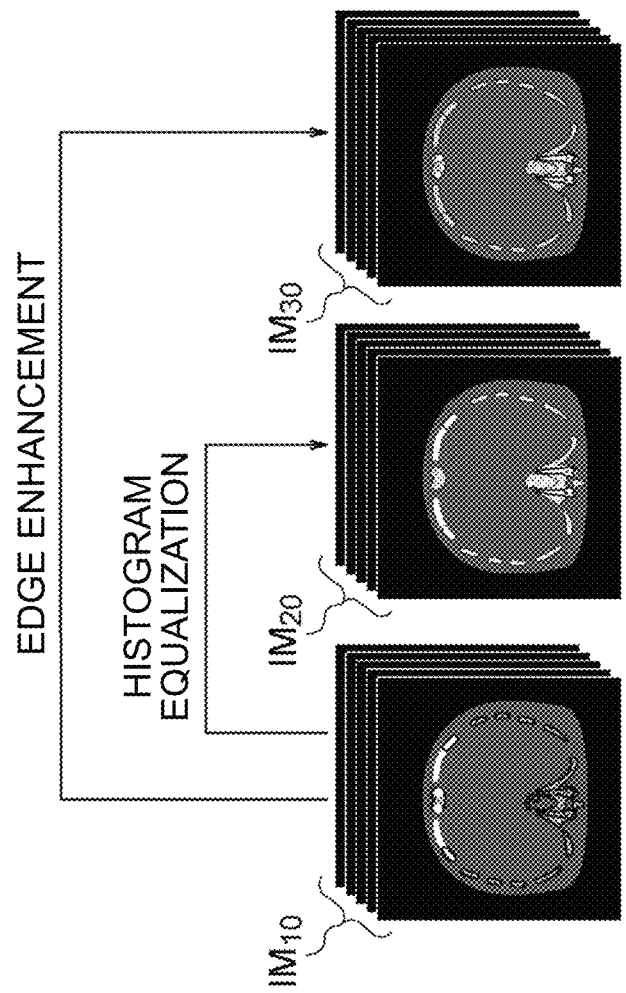
FIG. 11 is a diagram showing other grayscale images.

An image processing section 51 produces, based on a one-channel image (e.g., a CT image IM10 shown in FIG. 10), other one-channel images (e.g., a histogram-equalized image IM20 and an edge-enhanced image IM30 shown in FIG. 11). A one-channel image has one-channel information, and represents a grayscale image, for example. A specific example of the one-channel image will be discussed later.

A multi-channel image producing section 52 produces a multi-channel image IMb (see FIG. 12) containing image information on each of the three one-channel images (CT image IM10, histogram-equalized image IM20, and edge-enhanced image IM30). The multi-channel image IMb will be discussed later.

An inference section 53 performs inference using a learned model. Specifically, the inference section 53 inputs the multi-channel image IMb to a learned model, performs inference, and produces an output image IMout according to a result of the inference as output data (see FIG. 13). A method of generating a learned model will be discussed later.

In the storage device 22 are stored programs representing the processing of the functional blocks described above. The storage device 22 may be a non-transitory, computer-readable recording medium in which one or more processor-executable instructions are stored. The one or more instructions cause, when executed by the processor, execution of the operation comprising the acts (a)-(c) below:
 (a) producing, based on a one-channel image (e.g., the CT image IM10 shown in FIG. 10), other one-channel images (e.g., the histogram-equalized image IM20 and edge-enhanced image IM30 shown in FIG. 11) (the image processing section 51);
 (b) performing inference by a learned model (the inference section 53); and
 (c) producing a multi-channel image IMb containing image information on each of the three one-channel images (CT image IM10, histogram-equalized image IM20, and edge-enhanced image IM30) (the multi-channel image producing section 52).

It should be noted that the act of performing inference by a learned model of (b) comprises: inputting the multi-channel image IMb to the learned model, performing inference, and producing an output image IMout according to a result of the inference as output data.

The workstation W2 comprises a non-transitory, computer-readable storage section 22 (storage medium) in which one or more instructions for executing the acts (a)-(c) are stored, and a processor 21 for executing the instructions stored in the storage section 22 (storage medium). The processor 21 is one example of the inference apparatus in the present disclosure. While according to the present embodiment, the processor 21 and storage section 22 are provided in the workstation W2, they may be provided in any modality (Q1 to Qa).

According to the present embodiment, in the workstation W2 stores a learned model. The learned model is generated by learning training data. According to the present embodiment, after imaging a patient by a modality, the learned model is used to perform inference for extracting an object to be extracted based on an image of the patient. The "object to be extracted" refers to an object desired to be extracted according to the objective of a diagnosis, and is, for example, an organ, a tumor, a metal member implanted in a body, or the like. In the case that an object to be extracted is contained in an image, the workstation W2 outputs an output image containing the object to be extracted, and sends it to the modality, as needed.

In recent years, a technique of generating a learned model with DL (deep learning), and executing image processing using the learned model has been growing in use. Successes of DL learned model-based image processing include image processing of color images, such as fundus camera images and endoscopic images, and there is a tendency of the DL-based image processing of fundus camera images and endoscopic images to be increasingly used in practice.

On the other hand, image processing of medical images displayed in grayscale, such as CT images, is still behind the aforementioned color images in practical application of DL-based image processing. The reason thereof may be considered as follows.

A DL platform, represented by TensorFlow or the like, can handle three-channel information. Consider here a color image, such as a fundus camera image or an endoscopic image: a color image provides three sets of information (three-channel information corresponding to RGB) from one image. Therefore, in handling a color image, all of the three channels that can be handled by a DL platform are efficiently used.

On the other hand, in a grayscale image, such as a CT image, one image provides only one set of information (that is, one-channel information). Since a grayscale image is thus a one-channel image having one-channel information, in handling a grayscale image, only one of the three channels that can be handled by a DL platform is efficiently used, posing a problem that it is difficult to perform learning and inference for producing images that are effective in diagnosis. Accordingly, the present embodiment implements a method with which, in handling grayscale images, such as CT images, it is possible to generate a learned model suitable for DL-based image processing. Now a learning step for generating a learned model in the present embodiment will be described hereinbelow. In the example below, a case in which a learned model is generated based on a CT image will be described, although the present disclosure is applicable to generation of a learned model using any grayscale image (e.g., an MR image, a mammographic image) other than CT images.

Figure 3:
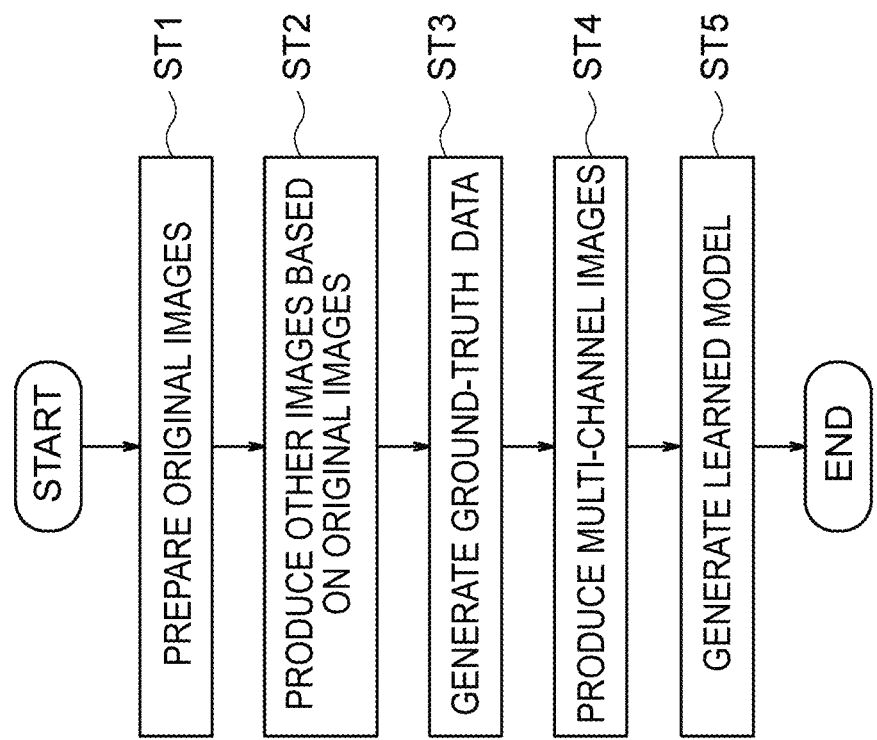
FIG. 3 is a diagram showing a flow chart of a learning step.

FIG. 3 is a diagram showing a flow chart of a learning step.

Figure 4:
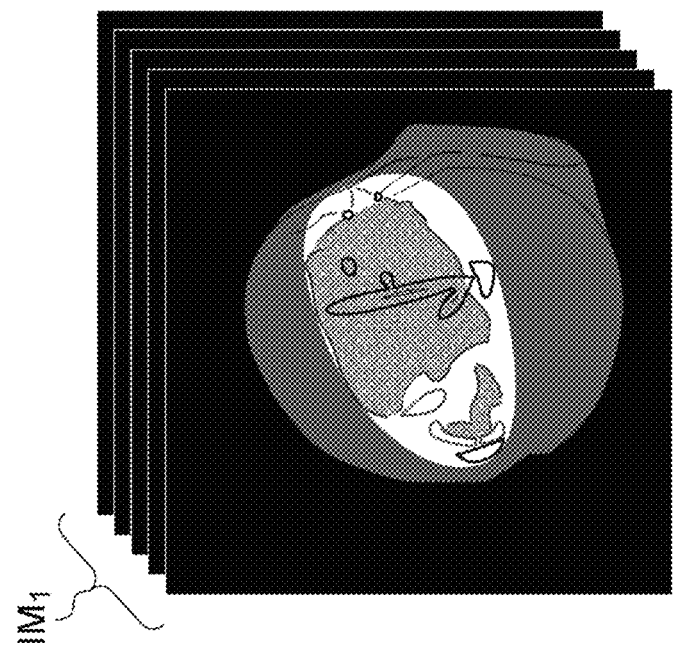
FIG. 4 is a diagram schematically showing original images IM1.

At Step ST1, a plurality of original images used at the learning step are prepared. FIG. 4 is a diagram schematically showing a plurality of original images IM1 prepared. Each original image IM1 is a grayscale image. In FIG. 4, organs, etc. in the inside of a body rendered in the image IM1 are shown in a simplified manner.

It is assumed that at the learning step in the present embodiment, a learned model for extracting a metal member implanted in a human body is generated. Therefore, at Step ST1, a plurality of CT images IM1 obtained by CT-scanning a human being having a metal member implanted therein are prepared as the plurality of original images IM1 for use in generating a learned model.

Incidentally, a metal member can be implanted in any of various body parts of a human body. Moreover, since the angle at which the metal member is implanted with respect to a body part, the size, material, and shape of the metal member are determined on a patient-by-patient basis, they are not flatly determined and are wide-ranging. Accordingly, a plurality of CT images are prepared which represent various combinations of the body part in which the metal member is implanted, the angle at which the metal member is implanted with respect to a body part, the size, material, and shape of the metal member. Such CT images are used as the plurality of original images IM1 used in generation of a learned model.

Although it is desirable that the plurality of original images (CT images) IM1 have as similar imaging conditions as possible, it is possible to prepare a plurality of images captured with different imaging conditions as the plurality of original images IM1.

Figure 5:
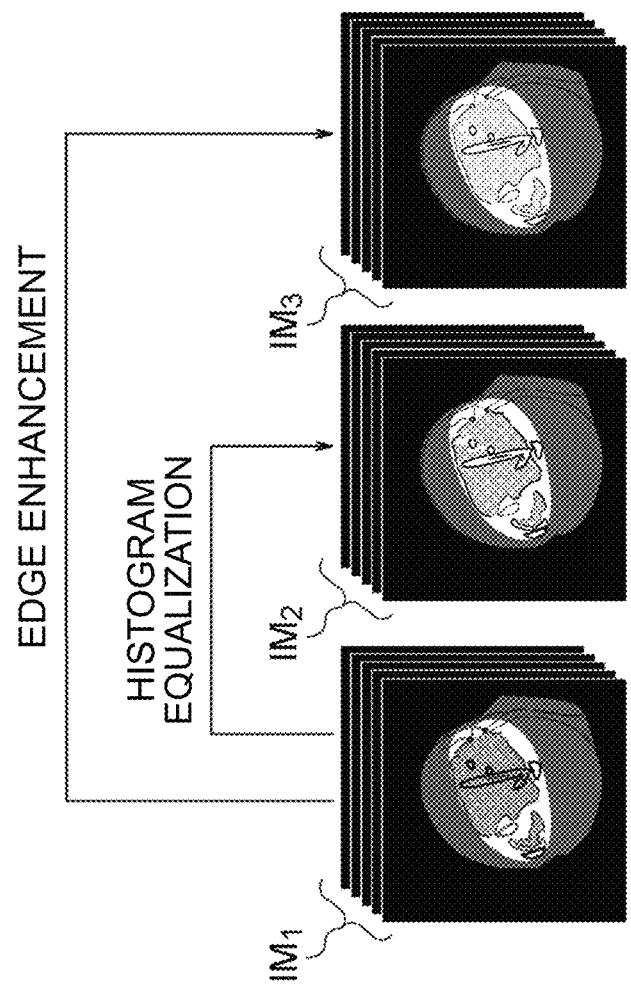
FIG. 5 is a diagram showing other grayscale images produced from the original image IM1.

At Step ST2, other grayscale images for use in generating a learned model, aside from the original images IM1, are produced. FIG. 5 is a diagram schematically showing other grayscale images produced.

A DL platform used in generation of a learned model is capable of handling three-channel information. On the other hand, the original image IM1 is a grayscale image, which is a one-channel image having one-channel information. Therefore, the original image IM1 described above is assigned to one of the three channels that can be handled by a DL platform. After assigning the original image IM1 to one channel of the DL platform, two channels are still left. Accordingly, to efficiently use the two channels, other grayscale images IM2 and IM3 are produced based on the original image IM1. In FIG. 5, organs, etc. in the inside of a body rendered in the images IM1, IM2, and IM3 are shown in a simplified manner.

The grayscale image IM2 is an image obtained by applying histogram-equalized processing to the original image IM1 (an image obtained by applying the histogram-equalized processing will be referred to hereinbelow as "histogram-equalized image"). On the other hand, the grayscale image IM3 is an image obtained by applying edge enhancement processing to the original image IM1 (an image obtained by applying the edge enhancement processing will be referred to hereinbelow as "edge-enhanced image"). These images IM2 and IM3 can be produced by known image processing algorithms.

Therefore, by executing Step ST2, the histogram-equalized image IM2 and edge-enhanced image IM3 can be produced as one-channel images each having one-channel information. After producing the histogram-equalized image IM2 and edge-enhanced image IM3, the flow goes to Step ST3.

At Step ST3, ground-truth data is generated. Since it is assumed in the present embodiment that a metal member is to be extracted, an image containing a metal member is produced as ground-truth data.

Figure 6:
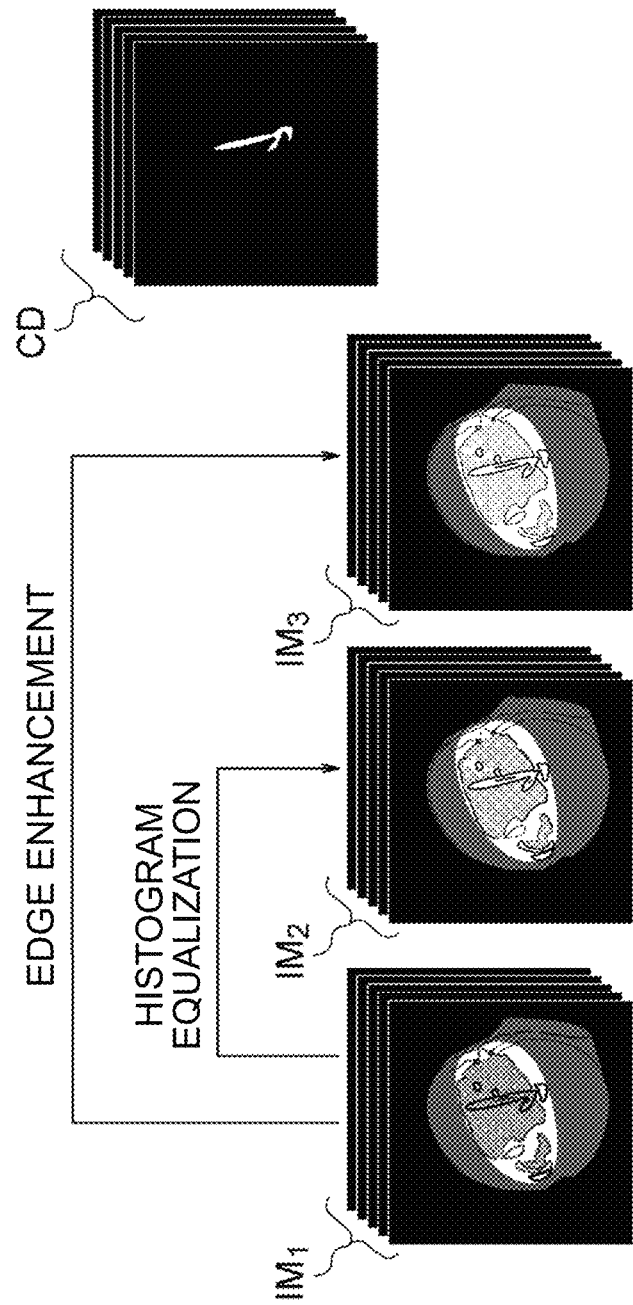
FIG. 6 is a diagram schematically showing ground-truth data CD.

FIG. 6 schematically shows ground-truth data CD. The ground-truth data CD may be prepared from, for example, the original images IM1. Specifically, from each original image, a region containing a metal member rendered in the original image may be extracted to prepare an image representing the extracted region as ground-truth data. It should be noted that in place of the process of extracting a region containing a metal member from the original image IM1, a region containing a metal member may be extracted from the histogram-equalized image IM2 or edge-enhanced image IM3 to prepare an image representing the extracted region as ground-truth data.

Figure 7:
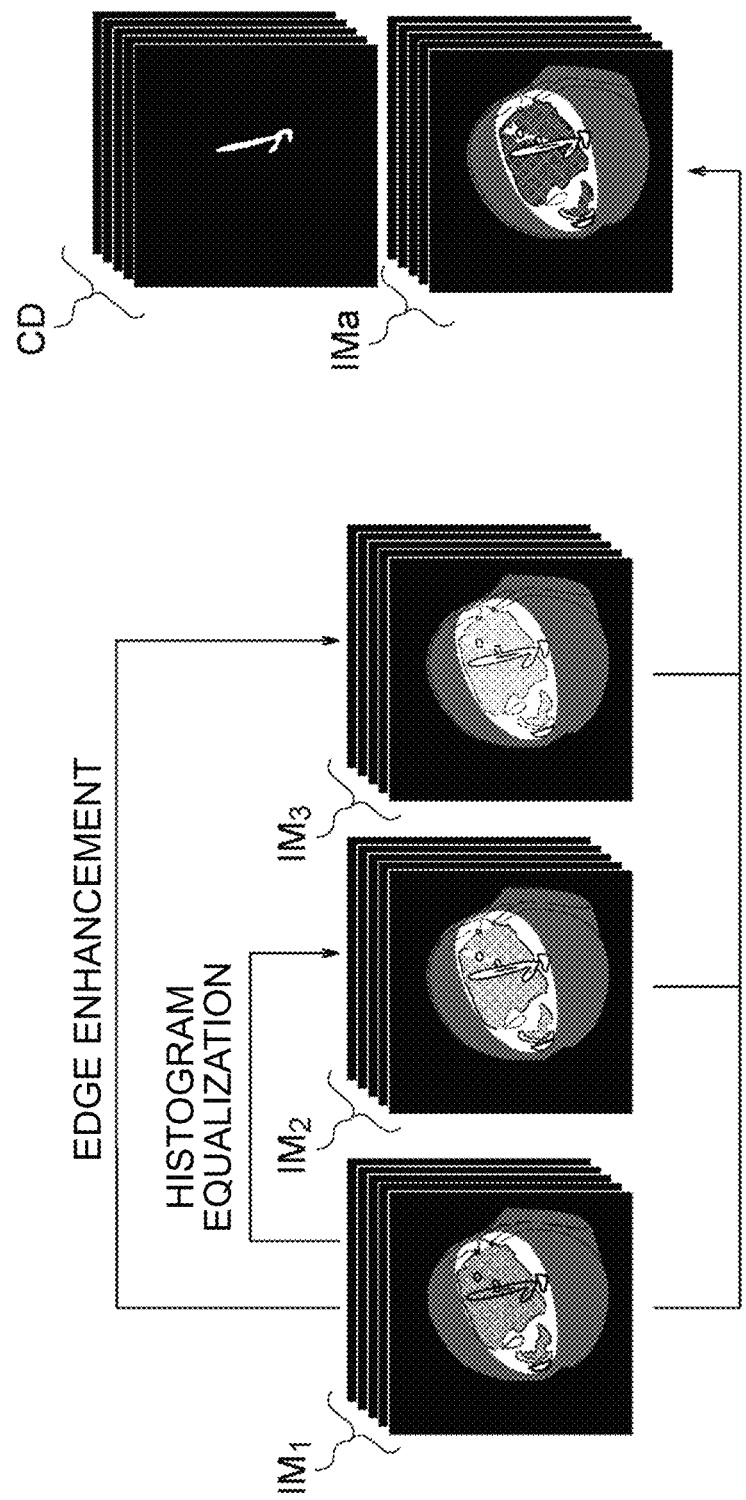
FIG. 7 is a diagram schematically showing multi-channel images IMa.

At Step ST4, there is produced a multi-channel image containing image information on each of the three one-channel images (the original image IM1, histogram-equalized image IM2, and edge-enhanced image IM3). FIG. 7 is a diagram schematically showing the multi-channel images IMa. In FIG. 7, organs, etc. in the inside of a body rendered in the multi-channel image IMa are shown in a simplified manner. The multi-channel image IMa is a three-channel image containing information on the original image IM1, histogram-equalized image IM2, and edge-enhanced image IM3.

Figure 8:
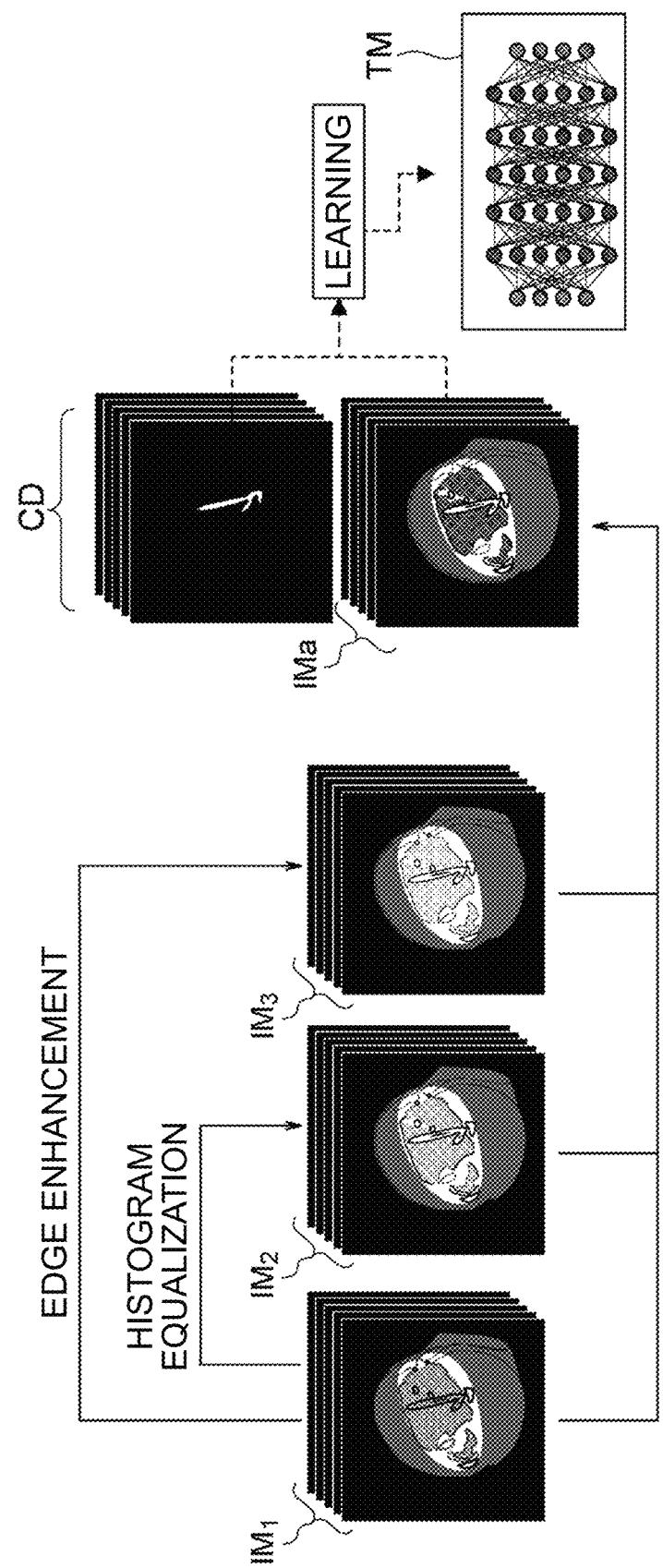
FIG. 8 is an explanatory diagram for a method of generating a learned model.

At Step ST5, a learned model for extracting a metal member is generated. FIG. 8 is an explanatory diagram for a method of generating a learned model.

A learned model TM may be generated by a DL platform, for example. By inputting the three-channel images IMa and ground-truth data CD to a DL platform to learn the three-channel images IMa and ground-truth data CD, the learned model TM may be generated. Here, a learned model TM suitable for extracting a metal member is generated. The learned model TM is stored in a workstation (e.g., the workstation W2 shown in FIG. 1) accessible by a medical institution, such as a hospital.

The flow of the learning step (see FIG. 3) thus ends.

The learned model TM obtained by the learning step described above is used when performing inference for extracting a metal member from an image of a patient. Now an example of an inference step of extracting a metal member by the learned model TM will be described hereinbelow referring to FIGS. 9 to 13.

Figure 9:
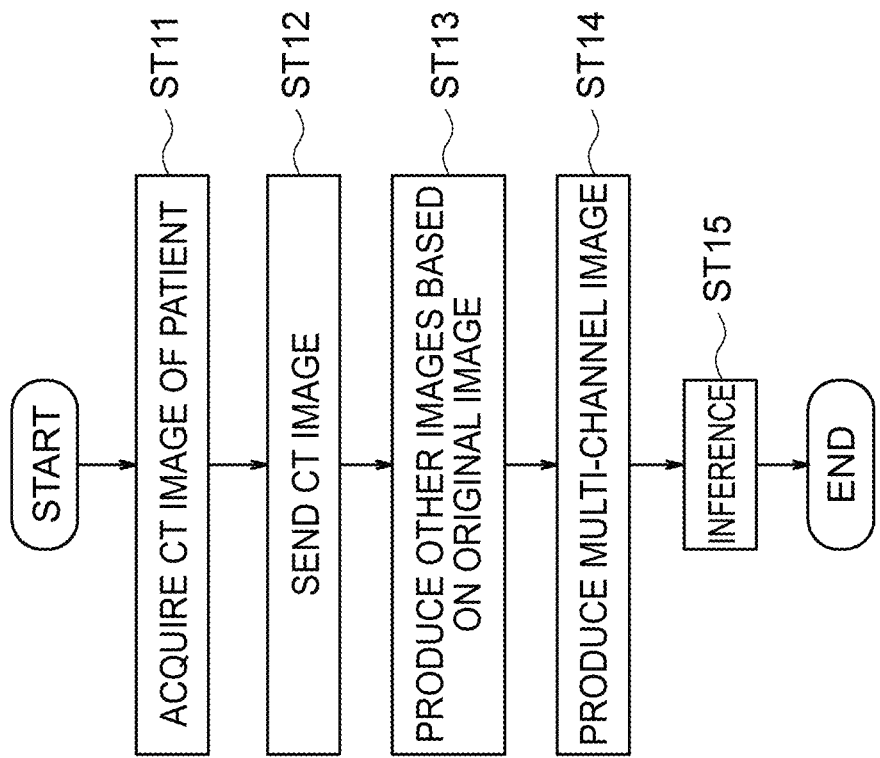
FIG. 9 is a flow showing an example of an inference step for extracting a metal member from an image of a patient by a learned model TM.

FIG. 9 is a flow showing the example of the inference step of extracting a metal member from an image of a patient by the learned model TM. While the method of extracting a metal member will be described hereinbelow taking an example in which the metal member is implanted in the patient's spine, the body part in which a metal member is implanted is not limited to the spine, and it is possible to identify a metal member implanted in any body part of a patient by the present disclosure.

At Step ST11, a modality having a CT apparatus is used to scan a patient, and a CT image of the patient is acquired. The processor provided in the modality's operator console reconstructs the CT image of the patient based on data collected by the scan by the CT apparatus. The reconstruction is executed by a reconstructing section in the processor in the operator console. FIG. 10 is a schematic diagram of a plurality of CT images IM10 acquired by the scan. The CT images IM10 are grayscale images. In FIG. 10, organs, etc. in the inside of a body rendered in the image IM10 are shown in a simplified manner. Moreover, in FIG. 10, an axial image of the spine part of a patient whose spine is implanted with a metal member is shown as an example of the CT image.

At Step ST12, to perform inference for extracting a metal member implanted in the patient based on the CT images acquired at Step ST11, the modality sends the acquired CT images to the workstation W2 (see FIG. 1).

At Step ST13, the workstation W2 produces other grayscale images needed in inference based on the CT images IM10 received from the modality. FIG. 11 is a diagram showing the other grayscale images produced.

As described earlier, a DL platform is capable of handling three-channel information. On the other hand, the CT image IM10 is a grayscale image, which is a one-channel image having one-channel information. Therefore, the CT image IM10 is assigned to one of the three channels that can be handled by a DL platform, and after assigning the CT image IM10 to one channel of the DL platform, two channels are still left. Accordingly, to efficiently use the two channels, the workstation W2 produces other grayscale images IM20 and IM30 based on the CT image IM10. In FIG. 11, organs, etc. in the inside of a body rendered in the images IM10, IM20, and IM30 are shown in a simplified manner.

According to the present embodiment, a histogram-equalized image and an edge-enhanced image are produced at the learning step (see FIG. 8), so that at the inference step are also produced a histogram-equalized image as the grayscale image IM20, and an edge-enhanced image IM30 as the grayscale image IM30.

The workstation W2 executes the processing of producing the histogram-equalized image IM20 and edge-enhanced image IM30 by the processor 21. On receipt of the original image (CT image) IM10, the processor 21 applies histogram-equalized processing to the original image IM10 to produce the histogram-equalized image IM20, and applies edge enhancement processing to the original image IM10 to produce the edge-enhanced image IM30. The processor 21 executes the processing of producing the histogram-equalized image IM20 and edge-enhanced image IM30 by the image processing section 51 (see FIG. 2). The images IM20 and IM30 may be produced by known image processing algorithms.

Therefore, by performing Step ST13, the histogram-equalized image IM20 and edge-enhanced image IM30 can be produced as one-channel images having one-channel information. After producing the histogram-equalized image IM20 and edge-enhanced image IM30, the flow goes to Step ST14.

Figure 12:
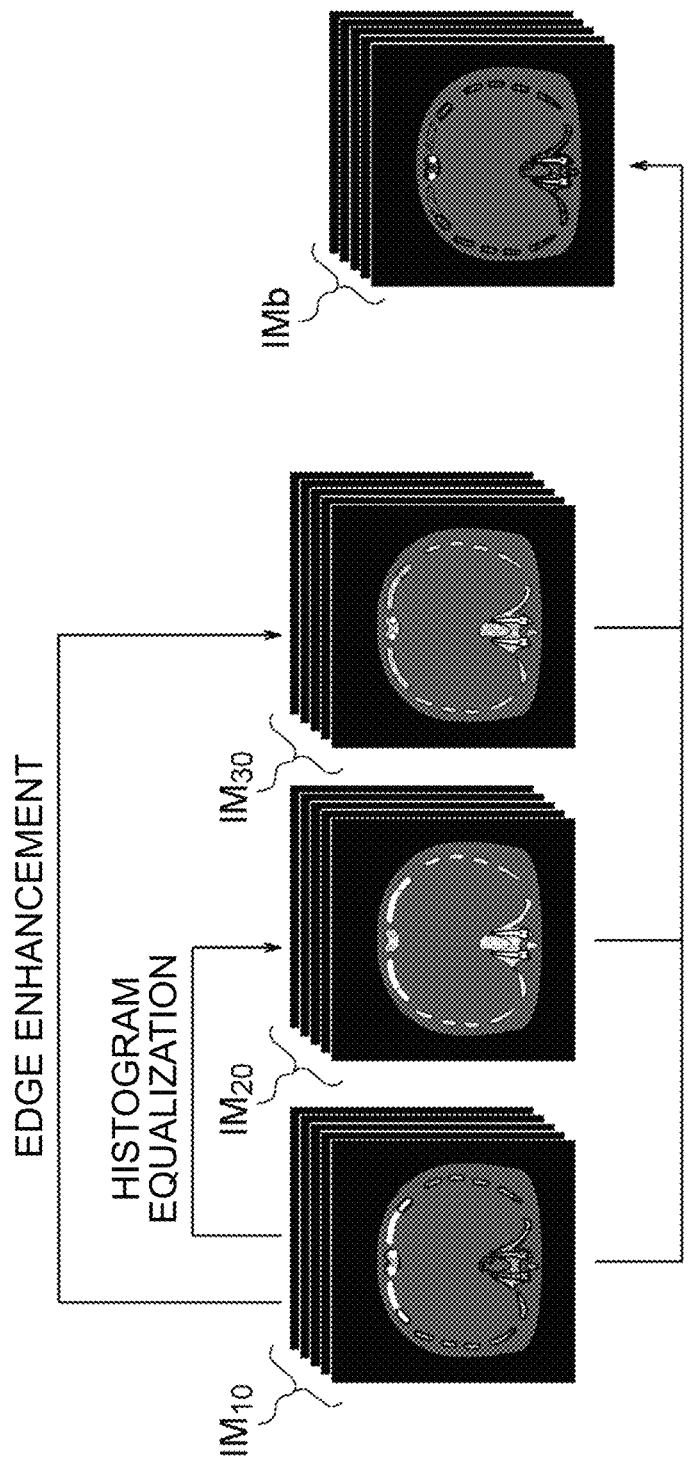
FIG. 12 is a diagram schematically showing a multi-channel image IMb.

At Step ST14, the processor 21 in the workstation W2 produces a multi-channel image containing image information on each of the three one-channel images (original image IM10, histogram-equalized image IM20, and edge-enhanced image IM30). FIG. 12 schematically shows a multi-channel image IMb produced. In FIG. 12, organs, etc. in the inside of a body rendered in the image IMb are shown in a simplified manner. The multi-channel image IMb is a three-channel image containing information on the original image IM10, histogram-equalized image IM20, and edge-enhanced image IM30. The processor 21 in the workstation W2 executes the processing of producing the multi-channel image IMb by the multi-channel image producing section 52 (see FIG. 2).

At Step ST15, the multi-channel image IMb is input to the learned model TM, and inference for extracting a metal member is performed. FIG. 13 is an explanatory diagram for the processing of extracting a metal member.

The processor 21 in the workstation W2 receives the three-channel image IMb as an input image of the learned model TM, performs inference for extracting a metal member from the three-channel image IMb, and outputs an output image IMout containing an extracted metal member as output data. The processor 21 performs the aforementioned inference by the inference section 53 (see FIG. 2).

After producing the output image IMout, the workstation W2 sends the output image IMc to the modality. The modality displays the received output image IMout on the display device in the operator console.

The flow in FIG. 9 thus ends.

According to the present embodiment, at the learning step (see FIG. 8), a DL platform is used to generate the learned model TM for extracting a metal member. In spite of the fact that a DL platform represented by TensorFlow or the like is, however, capable of handling three-channel information, an original image IM1 used in production of the learned model TM is a grayscale image, which provides only one-channel information from the original image IM1. Therefore, only one of the three channels that can be handled by a DL platform can be efficiently used merely by learning only the original images IM1, which may disadvantageously lower precision of inference.

Thus, according to the present embodiment, to efficiently use all the channels that can be handled by a DL platform, an original image IM1 is prepared (Step ST1, see FIG. 4), and the original image IM1 is used to produce a histogram-equalized image IM2 and an edge-enhanced image IM3 (Step ST2, see FIG. 5), and a three-channel image IMa containing information on the original image IM1, histogram-equalized image IM2, and edge-enhanced image IM3 is produced (Step ST4, see FIG. 7). Moreover, according to the present embodiment, ground-truth data CD is generated (Step ST3, see FIG. 6). Then, by learning the three-channel image IMa and ground-truth data CD, a learned model TM is generated (Step ST5, see FIG. 8). Since the three-channel image IMa contains information on the original image IM1, and in addition, information on the histogram-equalized image IM2 and edge-enhanced image IM3, it contains three-channel information. Therefore, a learned model TM using all the three channels that can be handled by a DL platform can be generated.

The learned model TM may be produced by a training apparatus for executing Steps ST1 to ST5, for example. Such a training apparatus may be comprised of a processor, and a non-transitory, computer-readable storage medium in which one or more processor-executable instructions are stored. The one or more instructions stored in the recording medium cause, when executed by the processor, execution of the operation of Steps ST1 to ST5. The operation of Steps ST1 to ST5 may be executed by one processor or by a plurality of processors.

Moreover, according to the present embodiment, the learned model TM generated by the learning step is used to execute the inference step. In the inference step, a histogram-equalized image IM20 and an edge-enhanced image IM30 are produced from the original image IM10 (see FIG. 11) corresponding to the histogram-equalized image IM2 and edge-enhanced image IM3 being produced from the original image IM1 at the learning step. Then, a three-channel image IMb containing image information on each of the original image IM10, histogram-equalized image IM20, and edge-enhanced image IM30 is produced (see FIG. 12). The three-channel image IMb is input to the learned model CD, and inference for extracting a metal member is performed. As described above, the learned model CD is produced based on all the three channels that can be handled by a DL platform. Therefore, by using the learned model CD, precision of inference for extracting a metal member can be improved as compared with the case in which a learned model generated based on only one channel is employed.

According to the present embodiment, inference is performed by the workstation W2 (see FIG. 1); however, inference may be performed by the modality, or the processing of inference may be shared between the modality and workstation.

According to the present embodiment, a CT image serves as the original image, and a histogram-equalized image and an edge-enhanced image are produced therefrom; then, a combination of the original image, histogram-equalized image, and edge-enhanced image is used to execute the learning and inference steps. However, only one of the histogram-equalized image and edge-enhanced image may be produced, and the learning and inference steps may be executed using a combination of the original image and histogram-equalized image, or a combination of the original image and edge-enhanced image. In this case, although information on one of the three channels that can be handled by a DL platform is not efficiently used, a combination of two images can be used to provide information on two channels. Therefore, by using a combination of two images, precision of inference can be improved as compared with a case in which only the original image is used.

According to the present embodiment, as shown in FIG. 8, the original image IM1 used in production of the three-channel image IMa is employed to prepare the other one-channel images (histogram-equalized image IM2 and edge-enhanced image IM3) used in production of the three-channel image IMa at the learning step. However, an initial image unused in production of the three-channel image IMa may be produced, and the three one-channel images used in production of the three-channel image IMa may be prepared from the initial image.

Moreover, according to the present embodiment, as shown in FIG. 13, the original image IM10 used in production of the three-channel image IMb is employed to prepare the other one-channel images (histogram-equalized image IM20 and edge-enhanced image IM30) used in production of the three-channel image IMb at the inference step. However, an initial image unused in production of the three-channel image IMb may be produced, and the three one-channel images used in production of the three-channel image IMb may be prepared from the initial image.

Furthermore, according to the present embodiment, a combination of the CT image (original image), histogram-equalized image, and edge-enhanced image is employed as a combination of one-channel images at the learning and inference steps. However, any other combination may be employed according to the clinical objective (see FIG. 14).

FIG. 14 is a table showing examples of combinations of images that can be used.

In FIG. 14, there are shown examples of combinations of images according to the clinical objectives (a)-(e).

Referring to (a), there is shown an example in which the objective is staging of hepatocellular carcinoma. In this case, as the combination of one-channel images can be used a combination of a plain CT image, a contrast-enhanced arterial-phase image (an arterial-phase CT image captured with a contrast medium), and a contrast-enhanced portal venous-phase image (a portal venous-phase CT image captured with a contrast medium).

Still referring to (a), as the ground-truth data employed at the learning step can be used, for example, an index indicating a stage of hepatocellular carcinoma associated with the combination of a plain CT image, a contrast-enhanced arterial-phase image, and a contrast-enhanced portal venous-phase image. The index is assigned with a value according to the stage of hepatocellular carcinoma. For example, when dividing the stages of hepatocellular carcinoma into four, a value of 1, 2, 3, or 4 is assigned to the index according to the stage of hepatocellular carcinoma. Thus, a learned model for staging hepatocellular carcinoma can be generated. The learned model makes an inference about the stage of hepatocellular carcinoma, and outputs an index indicating the stage of hepatocellular carcinoma as output data.

Referring to (b), there is shown an example in which an ischemic region is identified. In this case, as the combination of one-channel images can be used a combination of an MR-T2 image, an MR-DWI image, and an MR-ADC image (or an MR-FLAIR image). The "MR-T2 image" designates a T2 image captured by MRI, the "MR-DWI image" designates a DWI (diffusion-weighted) image captured by MRI, the "MR-ADC image" designates an ADC (apparent diffusion coefficient) image captured by MRI, and the "MR-FLAIR image" designates a FLAIR (fluid-attenuated inversion recovery) image captured by MRI.

Still referring to (b), as the ground-truth data employed at the learning step, an image representing an ischemic region can be used. The image may be prepared from an MR-T2 image, for example. Specifically, from each MR-T2 image, an ischemic region rendered in the image is extracted, and an image representing the extracted ischemic region may be prepared as the ground-truth data. Thus, a learned model for identifying an ischemic region can be generated. The learned model performs inference for identifying an ischemic region, and outputs an image containing the ischemic region as output data.

Moreover, rather than extracting the ischemic region from the MR-T2 image, it may be extracted from an MR-DWI image or an MR-ADC image (or an MR-FLAIR image), and an image representing the ischemic region extracted from the MR-DWI image or MR-ADC image (or MR-FLAIR image) may be prepared as the ground-truth data.

Referring to (c), there is shown an example in which the objective is tumor detection. In this case, as the combination of one-channel images, a combination of an MR-T1 image, an MR-T2 image, and an MR-DWI image can be used. The "MR-T1 image" designates a T1 image captured by MRI, the "MR-T2 image" designates a T2 image captured by MRI, and the "MR-DWI image" represents a DWI (diffusion-weighted) image captured by MRI.

Still referring to (c), as the ground-truth data employed at the learning step, position data representing information on the position of a tumor area can be used. The position data may be prepared from the MR-T1 image, for example. Specifically, for each MR-T1 image, position data representing the position at which the tumor area is rendered is determined, and the determined position data from each MR-T1 image may be prepared as the ground-truth data. Thus, a learned model for detecting a tumor area can be generated. The learned model performs inference for detecting a tumor area, and outputs position data representing information on the position of the tumor area as output data.

Moreover, position data representing the position of a tumor area may be determined using an MR-T2 image or an MR-DWI image, in place of the MR-T1 image, and the position data may be prepared as the ground-truth data.

Referring to (d), there is shown an example in which the objective is lesion detection or staging. In this case, as the combination of one-channel images can be used a combination of a CT-Mono 40 keV image, a CT-Mono 55 keV image, and a CT-Mono 70 keV image. The "CT-Mono 40 keV image" designates a 40-keV virtual monochromatic X-ray CT image, the "CT-Mono 55 keV image" designates a 55 keV virtual monochromatic X-ray CT image, and the "CT-Mono 70 keV image" designates a 70 keV virtual monochromatic X-ray CT image.

Still referring to (d), in the case that the objective is lesion staging, as ground-truth data employed at the learning step can be used, for example, an index indicating a stage of a lesion associated with the combination of a CT-Mono 40 keV image, a CT-Mono 55 keV image, and a CT-Mono 70 keV image. The index is assigned with a value according to the stage of a lesion. For example, when dividing the stages of a lesion into four, a value of 1, 2, 3, or 4 is assigned to the index according to the stage of a lesion. Thus, a learned model for staging a lesion can be generated. The learned model makes an inference about the stage of a lesion, and outputs an index indicating the stage of the lesion as output data.

On the other hand, in the case that the objective is lesion detection, as ground-truth data employed at the learning step, position data representing information on the position of a lesion area can be used. The position data may be prepared from a CT-Mono 40 keV image, for example. Specifically, position data representing the position at which a lesion area is rendered is determined for each CT-Mono 40 keV image, and the determined position data from each CT-Mono 40 keV image can be prepared as the ground-truth data. Thus, a learned model for detecting a lesion area can be generated. The learned model performs inference for detecting a lesion area, and outputs position data representing information on the position of the lesion area as output data.

Moreover, position data representing the position of a lesion area may be determined using a CT-Mono 55 keV image or a CT-Mono 70 keV image, in place of the CT-Mono 40 keV image, and the position data may be prepared as the ground-truth data.

In (d), there is shown the example of the combination of 40 keV, 55 keV, and 70 keV as a combination of energies for images. The combination of energies for images is, however, not limited to the combination of 40 keV, 55 keV, and 70 keV, and any combination of keVs is possible.

While (a) to (d) are examples in which a combination of three one-channel images is employed, it is possible to employ a combination of two one-channel images, in place of the combination of three one-channel images. Referring to (e), there is shown an example in which the objective is tumor detection, and as the combination of one-channel images can be used a combination of two one-channel images, i.e., a low-voltage iodinated contrast-enhanced mammographic image and a high-voltage plain mammographic image. The "low-voltage iodinated contrast-enhanced mammographic image" designates a mammographic image obtained by low-voltage iodinated contrast-enhanced imaging, and the "high-voltage plain mammographic image" designates a mammographic image obtained by high-voltage plain imaging.

Still referring to (e), as the ground-truth data employed at the learning step, position data representing information on the position of a tumor area can be used. The position data may be prepared from, for example, a low-voltage iodinated contrast-enhanced mammographic image. Specifically, for each low-voltage iodinated contrast-enhanced mammographic image, position data representing the position at which the tumor area is rendered is determined, and the determined position data from each low-voltage iodinated contrast-enhanced mammographic image may be prepared as the ground-truth data. Thus, a learned model for detecting a tumor area can be generated. The learned model performs inference for detecting a tumor area, and outputs position data representing information on the position of the tumor area as output data.

Moreover, position data representing the position of a tumor area may be determined using a high-voltage plain mammographic image, in place of the low-voltage iodinated contrast-enhanced mammographic image, and the position data may be prepared as the ground-truth data.

While information for one of three channels that can be handled by a DL platform is not efficiently used in (e), information for two channels can be obtained by two mammographic images. Therefore, it is expected that by using the two mammographic images, precision of inference will be improved as compared with a case in which only one mammographic image is simply used.

As described above, the present disclosure is not limited to CT images, and the learning and inference steps can be executed using a combination of images including MR images, mammographic images, etc., in addition to CT images.

According to the present embodiment, the description is addressed to a case in which the number of channels that can be handled by a DL platform is three. The present disclosure, however, may be applied to a case in which the number of channels that can be handled by a DL platform is two, or further, four or more. In the case that the number of channels that can be handled by a DL platform is two, a two-channel image can be produced as the multi-channel image at the learning and inference steps. In the case that the number of channels that can be handled by a DL platform is four or more, on the other hand, a k (>=4)-channel image can be produced as the multi-channel image at the learning and inference steps.

Embodiments of the present disclosure shown in the drawings and described above are example embodiments only and are not intended to limit the scope of the appended claims, including any equivalents as included within the scope of the claims. Various modifications are possible and will be readily apparent to the skilled person in the art. It is intended that any combination of non-mutually exclusive features described herein are within the scope of the present disclosure. That is, features of the described embodiments can be combined with any appropriate aspect described above and optional features of any one aspect can be combined with any other appropriate aspect. Similarly, features set forth in dependent claims can be combined with non-mutually exclusive features of other dependent claims, particularly where the dependent claims depend on the same independent claim. Single claim dependencies may have been used as practice in some jurisdictions require them, but this should not be taken to mean that the features in the dependent claims are mutually exclusive.

The invention claimed is:

1. An inference apparatus comprising:
an inference section for performing inference using a learned model, the learned model being generated by learning processing of learning a first multi-channel image containing image information on each of a first plurality of one-channel images, and ground-truth data; and
a multi-channel image producing section for producing a second multi-channel image containing image information on each of a second plurality of one-channel images of a patient, wherein the first plurality of one-channel images includes a first CT image, and one or more first other images produced based on the first CT image, and the second plurality of one-channel images include a second CT image, and one or more second other images produced based on the second CT image, and wherein the one or more first other images include a first histogram-equalized image produced by applying histogram-equalization processing to the first CT image, and a second edge-enhanced image produced by applying edge-enhancement processing to the first CT image,
the one or more second other images include a second histogram-equalized image produced by applying histogram-equalization processing to the second CT image, and a third edge-enhanced image produced by applying edge-enhancement processing to the second CT image, and
the ground-truth data is an image containing a metal member; and wherein
the inference section inputs the second multi-channel image to the learned model, and performs the inference.

2. The inference apparatus as recited in claim 1, wherein:
the ground-truth data is an image containing an object to be extracted, and
the inference section performs the inference to output an output image containing the object to be extracted.

3. The inference apparatus as recited in claim 1, wherein:
the first plurality of one-channel images include a first plain CT image, a first arterial-phase image representing a CT image in an arterial phase captured with a contrast medium, and a first portal venous-phase image representing a CT image in a portal venous phase captured with a contrast medium,
the second plurality of one-channel images include a second plain CT image, a second arterial-phase image representing a CT image in an arterial phase captured with a contrast medium, and a second portal venous-phase image representing a CT image in a portal venous phase captured with a contrast medium, and
the ground-truth data is an index indicating a stage of hepatocellular carcinoma.

4. The inference apparatus as recited in claim 1, wherein:
the first plurality of one-channel images includes a plurality of first monochromatic X-ray images with different energies,
the second plurality of one-channel images include a plurality of second monochromatic X-ray images with different energies, and
the ground-truth data is position data representing information on a position of a lesion area, or an index indicating a stage of a lesion.

5. An inference apparatus comprising:
an inference section for performing inference using a learned model, the learned model being generated by learning processing of learning a first multi-channel image containing image information on each of a first plurality of one-channel images, and ground-truth data; and
a multi-channel image producing section for producing a second multi-channel image containing image information on each of a second plurality of one-channel images of a patient, wherein the first plurality of one-channel images includes a first plurality of MR images, and
the second plurality of one-channel images include a second plurality of MR images, and wherein the first plurality of MR images includes a first T2 image, a first DWI image, and a first ADC image or a first FLAIR image,
the second plurality of MR images include a second T2 image, a second DWI image, and a second ADC image or a second FLAIR image, and
the ground-truth data is an image containing an ischemic area; and wherein the inference section inputs the second multi-channel image to the learned model, and performs the inference.

6. The inference apparatus as recited in claim 1, wherein: the first plurality of MR images includes a first T1 image, a first T2 image, and a first DWI image, the second plurality of MR images include a second T1 image, a second T2 image, and a second DWI image, and the ground-truth data is position data representing information on a position of a tumor area.

7. The inference apparatus as recited in claim 1, wherein:
the first plurality of one-channel images includes a first plurality of mammographic images,
the second plurality of one-channel images include a second plurality of mammographic images, and
the ground-truth data is position data representing information on a position of a tumor area.

8. A medical system comprising:
an inference section for performing inference using a learned model, the learned model being generated by learning processing of learning a first multi-channel image containing image information on each of a first plurality of one-channel images, and ground-truth data; and
a multi-channel image producing section for producing a second multi-channel image containing image information on each of a second plurality of one-channel images of a patient, wherein the first plurality of one-channel images includes a first CT image, and one or more first other images produced based on the first CT image, and the second plurality of one-channel images include a second CT image, and one or more second other images produced based on the second CT image, and wherein the one or more first other images include a first histogram-equalized image produced by applying histogram-equalization processing to the first CT image, and a second edge-enhanced image produced by applying edge-enhancement processing to the first CT image,
the one or more second other images include a second histogram-equalized image produced by applying histogram-equalization processing to the second CT image, and a third edge-enhanced image produced by applying edge-enhancement processing to the second CT image, and
the ground-truth data is an image containing a metal member; and wherein
the inference section inputs the second multi-channel image to the learned model, and performs the inference.

* * * * *